(12) United States Patent
Stewart et al.

(10) Patent No.: US 10,055,881 B2
(45) Date of Patent: Aug. 21, 2018

(54) VIDEO IMAGING TO ASSESS SPECULARITY

(71) Applicant: Microsoft Technology Licensing, LLC, Redmond, WA (US)

(72) Inventors: Monica Stewart, Seattle, WA (US); Matthew Adam Simari, Seattle, WA (US); Michael Hall, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 130 days.

(21) Appl. No.: 15/096,024

(22) Filed: Apr. 11, 2016

(65) Prior Publication Data
US 2017/0018114 A1 Jan. 19, 2017

Related U.S. Application Data

(60) Provisional application No. 62/192,280, filed on Jul. 14, 2015.

(51) Int. Cl.
| | |
|---|---|
| *G06T 15/50* | (2011.01) |
| *G06T 5/00* | (2006.01) |
| *G06T 5/50* | (2006.01) |
| *G06T 7/40* | (2017.01) |
| *G06T 15/04* | (2011.01) |

(52) U.S. Cl.
CPC ............ *G06T 15/506* (2013.01); *G06T 5/002* (2013.01); *G06T 5/50* (2013.01); *G06T 7/40* (2013.01); *G06T 15/04* (2013.01); *G06T 2200/04* (2013.01); *G06T 2200/08* (2013.01); *G06T 2207/10004* (2013.01);
(Continued)

(58) Field of Classification Search
None
See application file for complete search history.

(56) References Cited

U.S. PATENT DOCUMENTS 5,742,292 A * 4/1998 Murata ................... G06T 15/50
345/426
6,813,034 B2 11/2004 Rosencwaig et al.
(Continued)

FOREIGN PATENT DOCUMENTS

| DE | 102007037131 A1 | 5/2008 |
| KR | 20130024312 A | 3/2013 |
| KR | 20140030659 A | 3/2014 |

OTHER PUBLICATIONS

Krotosky, et al., "A Comparison of Color and Infrared Stereo Approaches to Pedestrian Detection", In Proceedings of IEEE Intelligent Vehicles Symposium, Jun. 13, 2007, pp. 81-86.
(Continued)

*Primary Examiner* — Said Broome
(74) *Attorney, Agent, or Firm* — Alleman Hall Creasman & Tuttle LLP

(57) ABSTRACT

A method for virtual, three-dimensional modeling of a subject using a depth-imaging camera operatively coupled to a modeling computer. A brightness image and a coordinate depth image of the subject acquired from each of a plurality of inequivalent vantage points are received from the depth-imaging camera. An angle-dependent reflectance is determined based on the brightness and coordinate depth images acquired from each of the vantage points.

20 Claims, 9 Drawing Sheets

(52) U.S. Cl.
CPC ........... *G06T 2207/10016* (2013.01); *G06T 2207/10028* (2013.01); *G06T 2215/16* (2013.01)

(56) References Cited

U.S. PATENT DOCUMENTS

| | | | |
|---|---|---|---|
| 7,397,553 B1 | 7/2008 | Mehanian et al. | |
| 7,502,112 B2 | 3/2009 | Kahn et al. | |
| 7,711,182 B2 | 5/2010 | Beardsley | |
| 8,107,721 B2 | 1/2012 | Beardsley et al. | |
| 8,436,855 B1* | 5/2013 | Morgan | G06T 15/80 345/419 |
| 2002/0080148 A1* | 6/2002 | Uchino | G06T 15/50 345/629 |
| 2003/0223083 A1 | 12/2003 | Geng | |
| 2011/0025827 A1 | 2/2011 | Shpunt et al. | |
| 2011/0040524 A1 | 2/2011 | Burry et al. | |
| 2011/0292406 A1 | 12/2011 | Hollenbeck et al. | |
| 2012/0250120 A1 | 10/2012 | Ostroverkhov et al. | |
| 2013/0004060 A1 | 1/2013 | Bell et al. | |
| 2013/0301908 A1 | 11/2013 | Shim et al. | |
| 2014/0368613 A1 | 12/2014 | Krupka | |

OTHER PUBLICATIONS

Lefloch, et al., "Technical Foundation and Calibration Methods for Time-of-Flight Cameras", In Proceedings of 35th German Conference on Pattern Recognition, Sep. 2013, pp. 1-20.

Whyte, R. et al., "Review of Methods for Resolving Multi-path Interference in Time-of-Flight Range Cameras", In Proceedings of the IEEE Sensors Conference 2014, Nov. 2, 2014, Valencia, Spain, 4 pages.

ISA European Patent Office, International Search Report and Written Opinion Issued in PCT Application No. PCT/US2016/039471, dated Sep. 28, 2016, WIPO, 13 pages.

* cited by examiner

VIDEO IMAGING TO ASSESS SPECULARITY

CROSS REFERENCE TO RELATED APPLICATIONS

This application claims priority to U.S. Provisional Application 62/192,280, filed Jul. 14, 2015 and entitled "VIDEO IMAGING TO ASSESS SPECULARITY", the entirety of which is hereby incorporated herein by reference, for all purposes.

BACKGROUND

Recent advances in depth-imaging technology have enabled the development of compact, low-cost depth-imaging cameras for the consumer market. These depth-imaging cameras are available as stand-alone devices and as components designed for integration into more complex devices and systems. Some of the new depth-imaging cameras employ time-of-flight (ToF) imaging. The ToF imaging approach is precise and economical, but may be prone to error when applied to problematic subject geometries and material properties.

SUMMARY

One aspect of this disclosure is directed to a method for virtual, three-dimensional modeling of a subject using a depth-imaging camera operatively coupled to a modeling computer. In this method, coordinate brightness and depth images of the subject are received from the depth-imaging camera. The images are acquired from each of a plurality of inequivalent vantage points. An angle-dependent reflectance is determined based on the coordinate brightness and depth images acquired from each of the vantage points.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve the disadvantages identified in this disclosure.

DETAILED DESCRIPTION

This disclosure describes configurations and associated methods for accurate surface mapping of real-world subjects via depth imaging. More specifically, the systems and methods described herein support 'object capture' (OCAP). OCAP is a term applied to the optical digitization of a real world object (a 'subject' herein). As depth-imaging systems proliferate, high-fidelity OCAP is expected to become increasingly ubiquitous, driven in part by related technologies, such as 3D printing and holographic projection.

One impediment to reliable OCAP is the acquisition of a subject having variable optical and/or material properties. In ToF imaging, a highly reflective subject locus can indirectly illuminate another locus, causing 'multipath' interference. More specifically, integration of light received along different optical paths, but arriving at the same pixel, corrupts depth estimation. Closely analogous to multipath interference in ToF imaging is the problem of reflection-induced overlapping patterns encountered using structured-light projection, another depth-imaging technique. Various methods to detect and/or correct for multipath interference have been advanced, but are computationally expensive and may not reverse all kinds of errors. Some methods rely on scanning very small active illumination patches distributed over the subject; these methods may be limited by low light power (yielding noisy scans on low reflectivity subjects) or may require undesirably long scan times (exposing motion blur). Other material-related limitations, besides multipath interference and the like, present challenges for OCAP. Another is the inability of native ToF systems to resolve surface attributes—e.g., textures and other material properties—for subsequent modeling in ray tracing applications.

The approach now disclosed uses a depth-imaging camera with active illumination to capture both depth and brightness imagery while the camera is moved around the subject, and/or, while the subject is moved around the camera. Reflectivity is estimated as a function of imaging angle relative to subject features. The reflectivity information may be used to probe the surface properties of the subject, correct multipath interference for better depth estimation, and/or alert the user that potentially problematic loci are present in a scene. A basic feature of the disclosed solution is a depth-imaging camera or registered camera array capable of recording both a depth image of the subject and a coordinate brightness image with pixel brightness proportional to the intensity of the probe light reflected back from the imaged locus.

Figure 1:
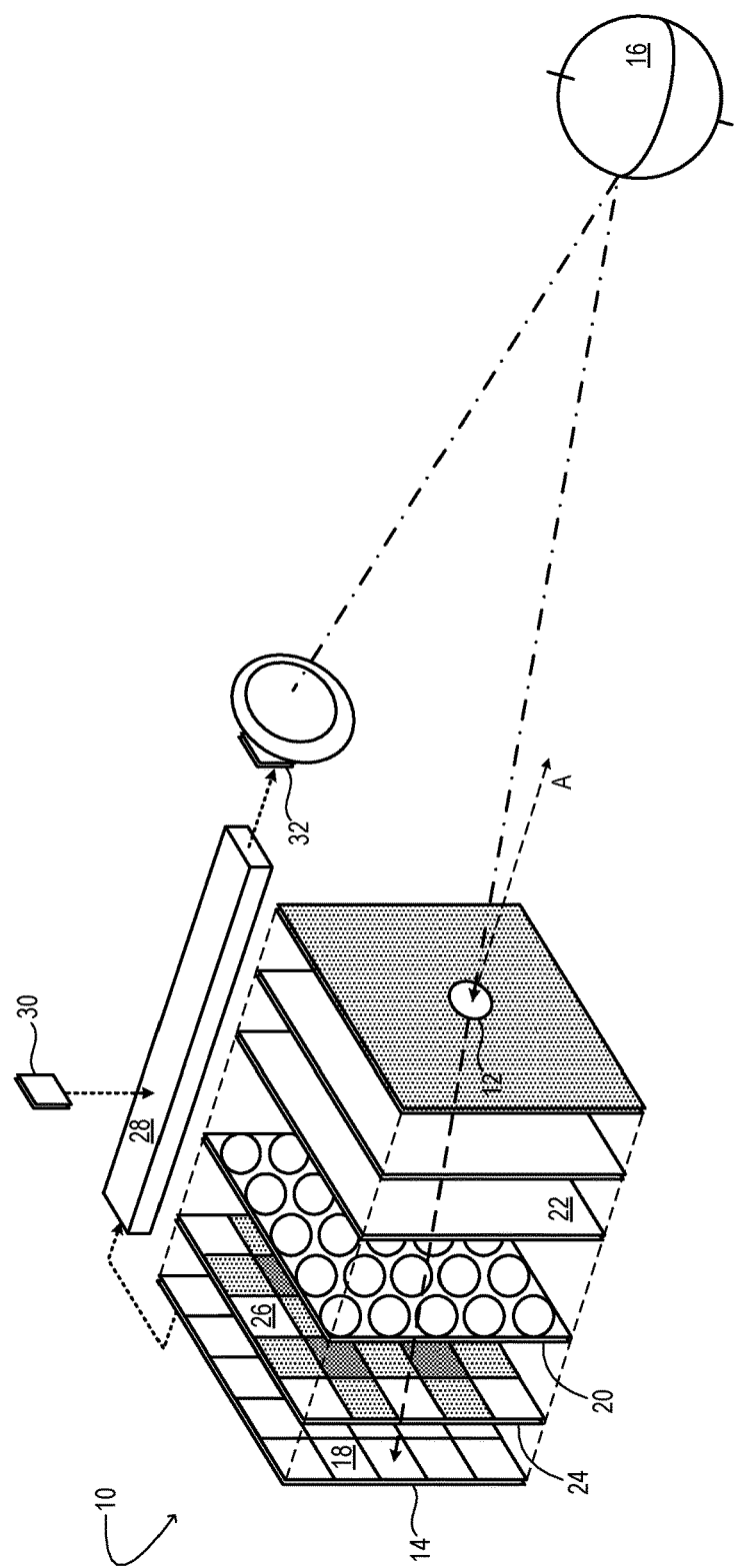
FIG. 1 shows aspects of an example depth-imaging camera.

The exploded view in FIG. 1 shows aspects of an example camera 10. The term 'camera' refers herein to any imaging component having at least one optical aperture 12 and sensor array 14 configured to image a scene or subject 16. The camera may also include an imaging optic, such as a lens (not shown in FIG. 1), arranged forward of the aperture. The sensor array of camera 10 includes a two-dimensional matrix of light-sensing sensor elements 18. In some implementations, the sensor elements may be complementary metal-oxide semiconductor (CMOS) elements, but other architectures are envisaged as well. Each sensor element may be intrinsically responsive to light over a broad wavelength band. For silicon-based sensor elements, the wavelength response may range from 300 to 1200 nm. Microlens array 20 is optionally arranged over sensor array 14 to provide a larger acceptance cone at each of the sensor elements, for increased collection efficiency.

Due to the broad wavelength response of sensor elements 18, one or more passive filters 22 may be arranged in series with sensor array 14 and configured to limit the wavelength response of the sensor array. The passive filters reduce noise by excluding photons of wavelengths not intended to be imaged. An IR-imaging camera, for example, may include a visible bandstop filter. In implementations in which both visible and narrow-band IR response is desired, a visible and narrow-band IR bandpass filter may be used. If configured also for color imaging, camera 10 may include a color filter array (CFA) 24 of color filter elements 26. The color filter elements may be arranged in registry with the sensor elements of the sensor array. An example CFA may present a Bayer pattern—i.e., a repeated tiling of 2×2 subarrays having two green-transmissive, one blue-transmissive, and one red-transmissive element in each subarray, for example. In this implementation, the integrated response from the sensor array may be converted into a full-color image using a de-mosaicing algorithm. In implementations in which both visible and IR response is required at each sensor element, each of the color filter elements may be transmissive in the IR band of interest.

Camera 10 includes an electronic controller 28. The electronic controller may include processor logic and associated electronic memory. The electronic memory may hold instructions that cause the processor logic to enact any operation, algorithm, computation, or transformation disclosed herein. In some implementations, the processor logic may take the form of an application-specific integrated circuit (ASIC) or system-on-a-chip (SoC), in which some or all of the instructions are hardware- or firmware-encoded. In general, the electronic controller may control the electronic shutter of sensor array 14, which affects the responsiveness of sensor elements 18 to incident light. The electronic controller is also configured to individually address each sensor element 18 of the array, as described further below.

Camera 10 may be configured for brightness imaging, depth imaging, or both. Accordingly, the term 'depth-imaging camera,' may refer herein to a camera configured for both depth and brightness imaging. For brightness imaging, sensor elements 18 are addressed so as to integrate the intensity of light received at each sensor element. The integrated intensity is then associated with the brightness of the portion of the image corresponding to that element. The resulting 'brightness image,' has a brightness value assigned to each of a plurality of pixel positions, registered each to a corresponding locus $(X_i, Y_i)$ of an imaged scene. A 'color image' is a brightness image in which brightness is resolved for each of a plurality of individual color channels—e.g., red, green, and blue.

For depth imaging, sensor elements 18 may be addressed somewhat differently. 'Depth' is defined herein as a coordinate that increases with increasing distance from aperture 12 of camera 10, in a direction parallel to optical axis A of the camera. In a 'depth image,' an array of pixel positions are registered each to a corresponding locus $(X_i, Y_i)$ of an imaged scene; the depth value $Z_i$ indicates, for each pixel position, the depth of the corresponding locus. To image depth, camera 10 makes use of a modulated emitter 32, which may include one or more infrared (IR) light-emitting diodes (LEDs) or an IR laser. Electronic controller 28 modulates the emitter at a high frequency (e.g., 100 MHz) and synchronously addresses sensor elements 18. For depth imaging, the act of addressing the sensor elements may include resolving a phase offset in the response of each sensor element relative to the modulation of the emitter. In some implementations, a series of observations acquired in rapid succession may be used to determine the phase offset. In some implementations, the phase offset from each sensor element may be converted into a pixel-resolved time-of-flight (ToF) of the modulated light—viz., from the emitter to a locus of the subject imaged at that sensor element and then back to the sensor array. ToF data may be converted into a depth coordinate and assembled into a depth image of the subject. In combination depth- and brightness-imaging applications, both of the above addressing modes may be used in an alternating (i.e., multiplexed) manner, using the same sensor array. In alternative implementations, depth and brightness images may be acquired by different sensor arrays, with corresponding pixel positions in the brightness and depth images identified according to a camera model.

The phase-discriminating ToF camera described above is one of several ToF implementations envisaged herein. Other configurations may include two or more sensor elements imaging the same locus of the subject. Each sensor element may include one or more finger gates, transfer gates and/or collection nodes. The sensor elements associated with each locus may be addressed so as to provide two or more integration periods synchronized to the modulated emission, the integration periods differing in phase and/or total integration time. Based on the relative amount of charge accumulated on the sensor elements during the different integration periods, the distance out to the reflecting locus of the subject may be obtained. In one, non-limiting example, the emitter and a first sensor element may be energized synchronously, while a second sensor element is energized 180° out of phase with respect to the first sensor element.

Figure 2A:
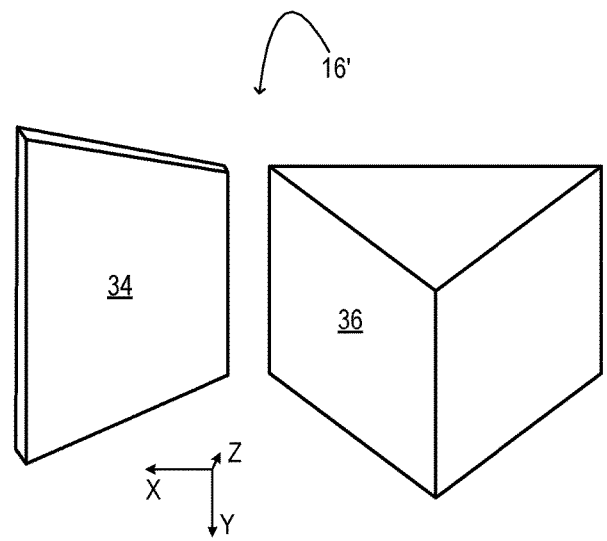
FIGS. 2A and 2B illustrate multipath reflection interference in ToF depth imaging.
Figure 2B:
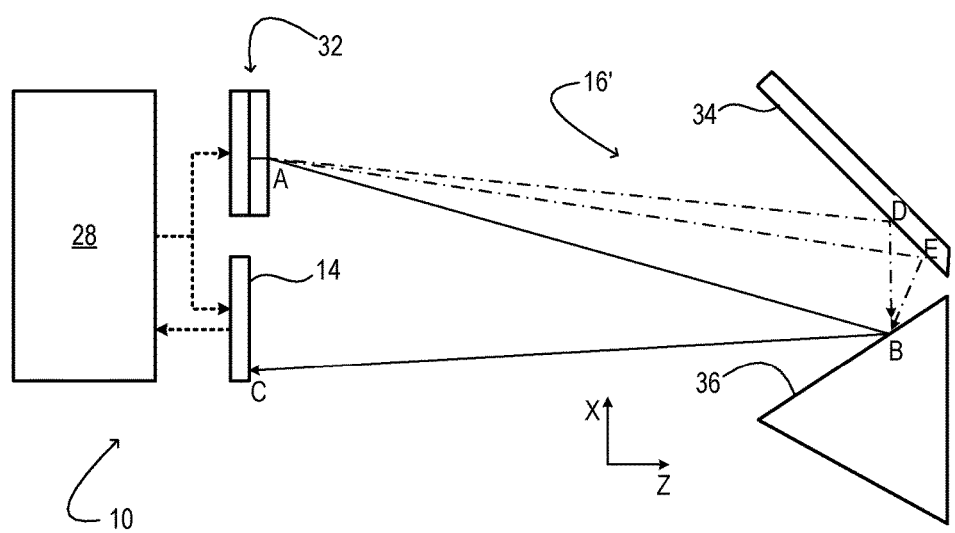

As noted above, image data from any ToF camera may be prone to error due to multipath interference. This issue is illustrated with reference to FIGS. 2A and 2B, which show aspects of an example subject 16'. The subject, in this case, is a pair of geometric solids that include a first area 34 and an adjacent second area 36. Both the first and second areas are planar surfaces parallel to the vertical Y axis. The first and second areas are set at an angle to each other, extending farthest along the depth axis Z in the region where they approach each other. In this example, the first area may be highly reflective of the probe light from modulated emitter 32. In other words, when illuminated by the probe light, first area 34 may reflect such light onto second area 36. In FIG. 2A, the configuration and orientation of subject 16' are chosen merely to simplify the discussion hereinafter; no aspect of the configuration or orientation are in any way limiting. FIG. 2B shows subject 16 in plan view, together with aspects of camera 10—emitter 32, sensor array 14, and electronic controller 28.

The depth-sensing approach described above gives reliable results under some conditions, but is prone to significant measurement error under other conditions. One source of error is indirect reflection of the probe light. In FIG. 2B, the desired light path for assessing the depth of locus B is the two-segment path ABC. However, numerous other paths may also result in probe light reaching photodetector 20 along ray BC-among them the three-segment paths ADBC and AEBC. Light reflected along a three-segment path is received at a larger-than-expected phase angle, which erroneously lengthens the measured depth of locus B.

In the illustrated example, indirect reflection is a consequence of the orientation of first area 34 relative to second area 36, which defines a concavity. Although reflection along any three-segment path will typically be less intense than the direct, two-segment reflection, various factors may increase the significance of indirect reflection as a noise source. For instance, if first area 34 is significantly reflective of the probe light, then the amount and angular content of the indirect reflection may be increased. Naturally, the larger the size of first area 34, the greater will be the amount of indirectly reflected light that reaches sensor array 14 along BC.

The range of depth-imaging systems envisaged herein extends beyond ToF cameras; it includes stereoscopic and structured-light cameras as well. In stereo implementations, brightness or color data from separated sensor arrays are co-registered and used to construct a depth image. More generally, depth coordinates into any scene may be obtained using one or more brightness-imaging cameras, with optical-tomography based co-registration of imaged features. Hyperspectral (e.g., visible+IR and/or UV) brightness imaging may be used with this approach, for improved feature discrimination. In structured-light examples, an IR illumination source associated with a depth-imaging camera may be configured to project onto the subject an illumination pattern comprising numerous discrete features—e.g., lines or dots. A sensor array in the depth-imaging camera may be configured to image the structured illumination reflected back from the subject. Based on the spacings between adjacent features in the various regions of the imaged subject, a depth image of the subject may be constructed.

Figure 3:
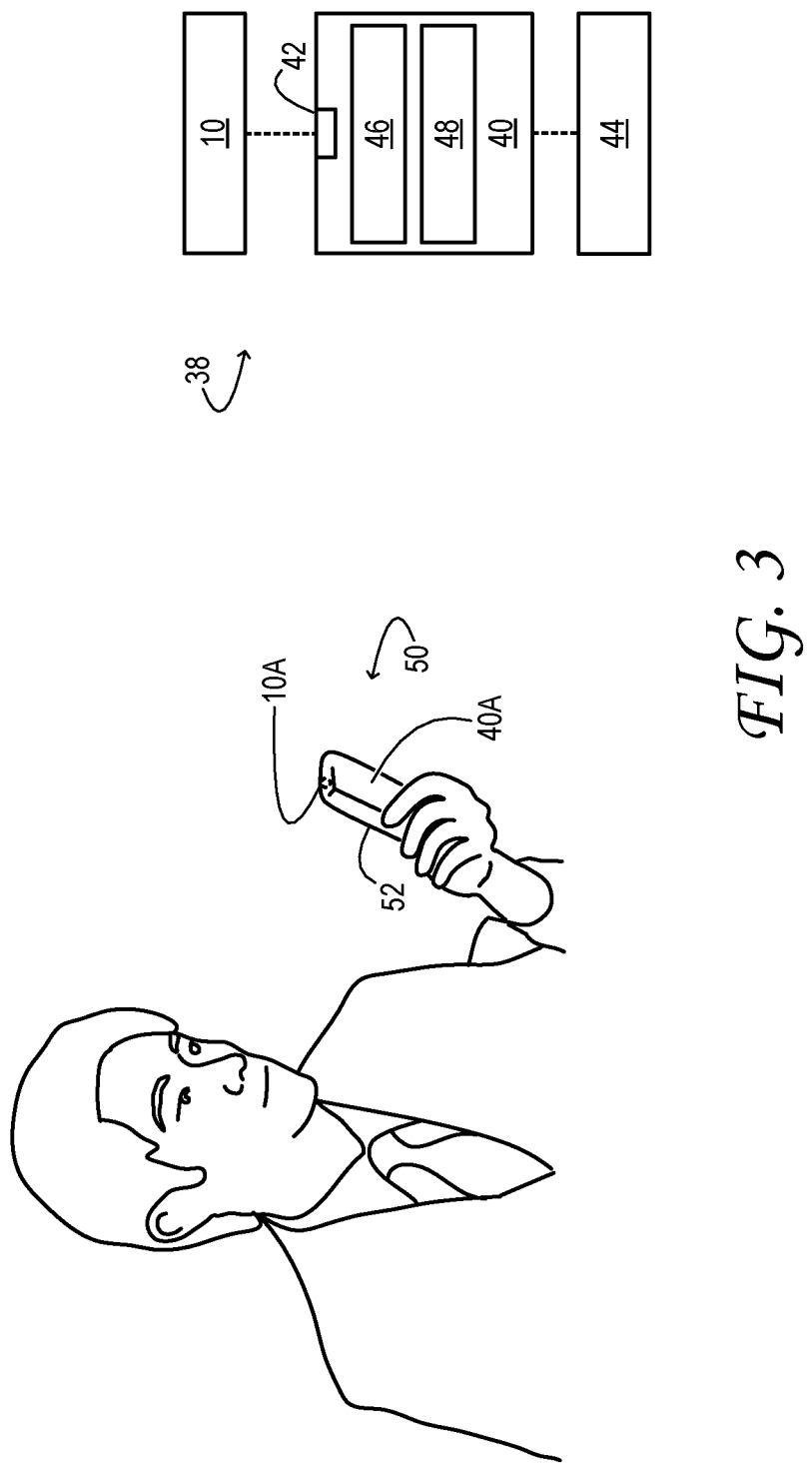
FIG. 3 shows aspects of an example modeling computer and a smartphone with an integrated depth-imaging camera.
Figure 4:
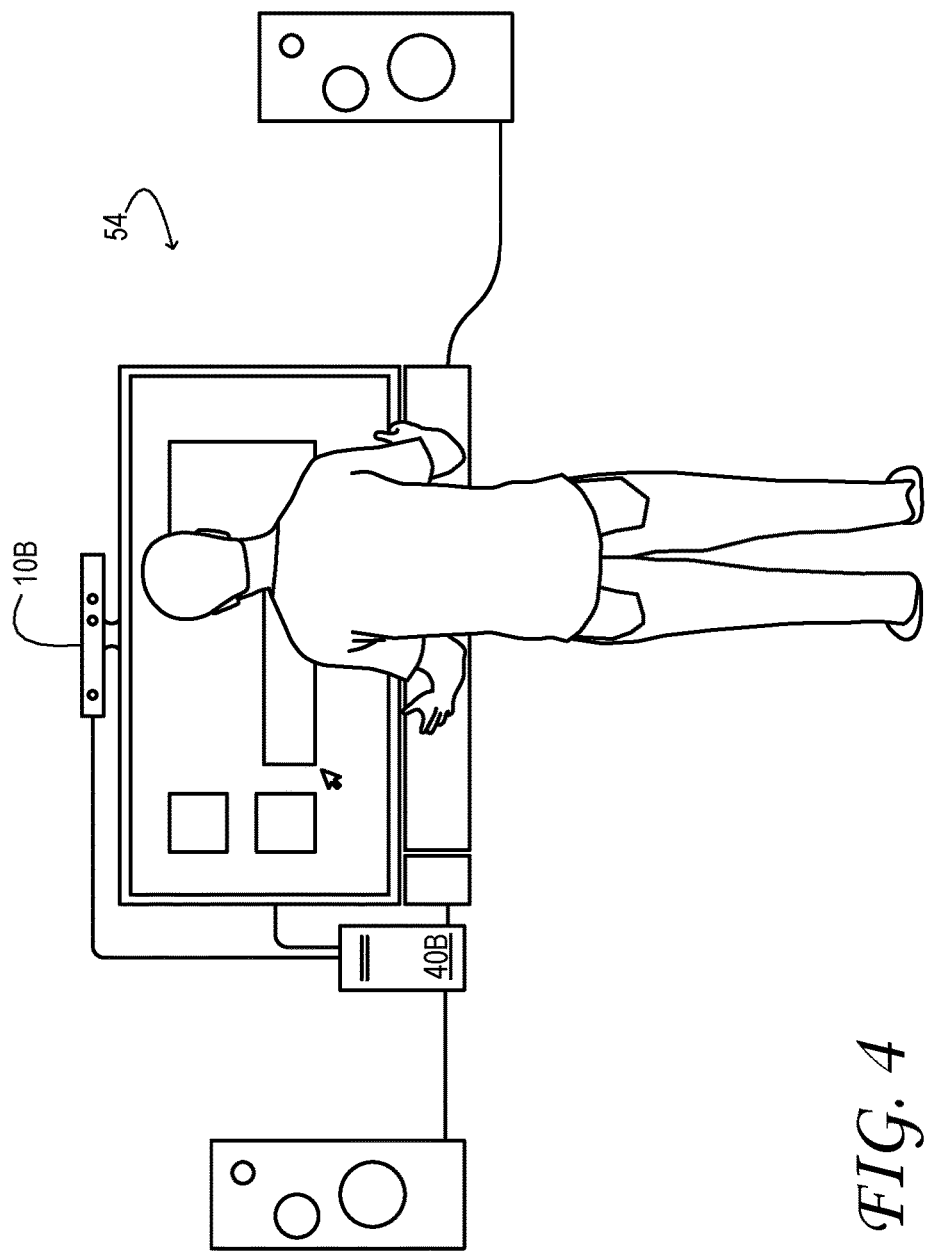
FIG. 4 shows aspects of an example home-theatre system with a peripheral depth-imaging camera and modeling computer.
Figure 5:
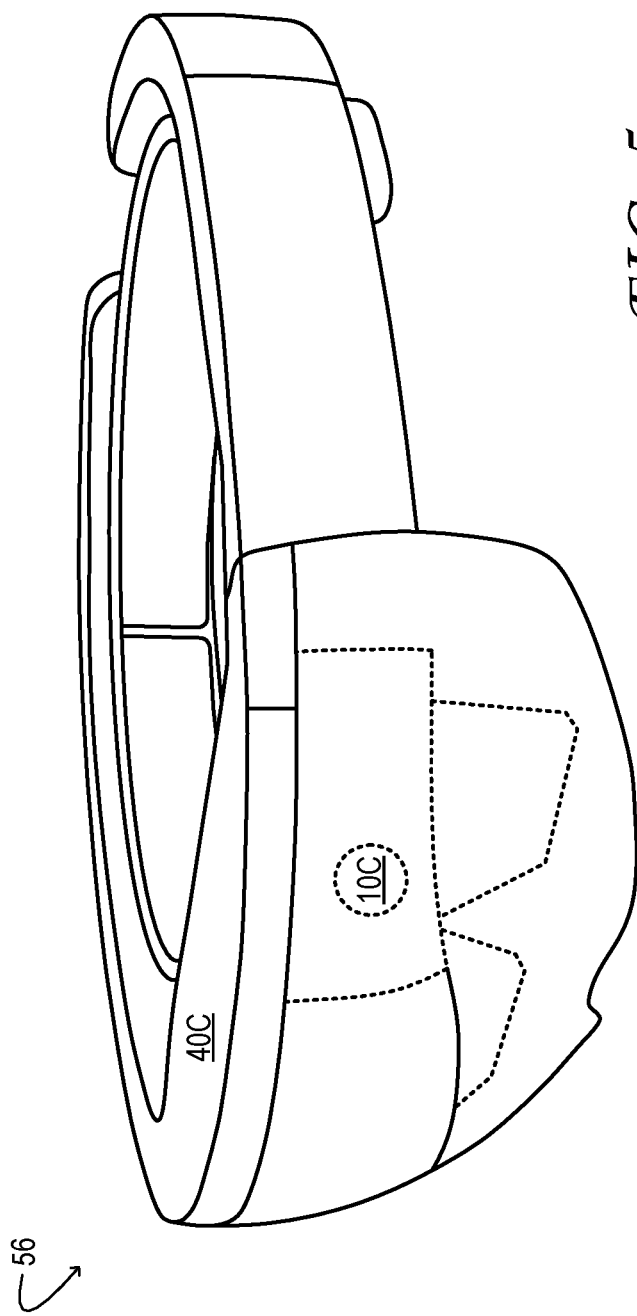
FIG. 5 shows aspects of an example head-mounted augmented-reality display system with an integrated depth-imaging camera and modeling computer.

As noted hereinabove, camera 10 may be integrated into a more complex device or system. FIGS. 3, 4, and 5 show example systems each having an integrated depth-imaging camera. Each of the illustrated systems may embody a virtual, three-dimensional modeling system 38, shown schematically in FIG. 3. The modeling system includes the depth-imaging camera 10, operatively coupled to a modeling computer 40 via a wired or wireless hardware interface 42. The modeling computer is also operatively coupled to an optional non-imaging sensor unit 44, which may include an inertial measurement unit (IMU) or global positioning-system (GPS) receiver. The modeling computer includes computer memory machine 46 and at least one logic machine 48. The computer memory machine may hold instructions that cause the logic machine(s) to enact various aspects of virtual, three-dimensional modeling, including the methods disclosed further below. Additional aspects of the modeling computer are described hereinafter.

FIG. 3 also shows, more specifically, a smartphone 50 with a modeling computer 40A and depth-imaging camera 10A arranged behind display bezel 52. FIG. 4 shows a home-theatre system 54 with peripheral modeling computer 40B and depth-imaging camera 10B. FIG. 5 shows a head-mounted augmented-reality display system 56 having an integrated modeling computer 40C and depth-imaging camera 10C. Each of these systems may also include an optional non-imaging sensor unit, not shown in the drawings.

Figure 6:
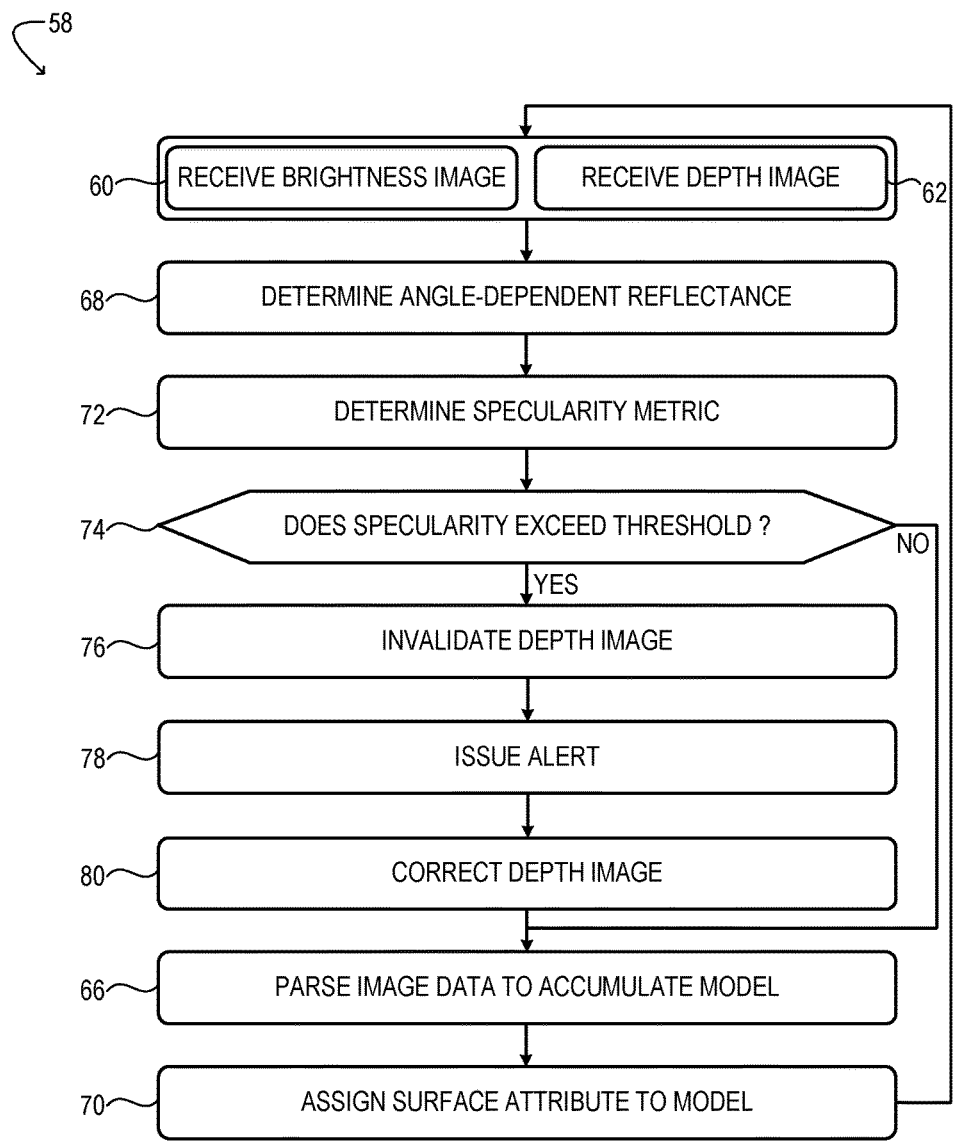
FIG. 6 illustrates aspects of an example method for virtual, three-dimensional modeling of a subject using a depth-imaging camera operatively coupled to a modeling computer.

FIG. 6 illustrates aspects of an example method 58 for virtual, three-dimensional modeling of a subject 16, using a virtual, three-dimensional modeling system. The modeling system may include a depth-imaging camera 10 operatively coupled to a modeling computer 40, as described above. In other implementations, the method may be enacted by an different modeling system. Method 58 describes, in addition to virtual, three-dimensional modeling of the imaged subject, optional supportive features of invalidating depth imagery that may be corrupted by multipath interference and/or correcting the corrupted depth imagery. In other implementations, the invalidating/corrective features can be used independent of the three-dimensional modeling aspect. Although FIG. 6 illustrates an example ordering of the various acts of the method, it will be understood that some of the features may be executed in a different order, or in parallel. In the following description, the various acts and features of the method are presented for clarity of illustration and numbered in that order, which is not necessarily the order of execution.

At the outset of method 58, coordinate images captured by depth-imaging camera 10 are received through hardware interface 42 of modeling computer 40. More specifically, at 60 a brightness image of subject 16 including a relative brightness value for each of a plurality of pixel positions is received from the camera, and at 62 a depth image of the subject including a depth value for each of a plurality of pixel positions is received from the camera. The term 'coordinate' emphasizes that the brightness image and its companion depth image are captured at substantially the same moment in time—i.e., concurrently or immediately successively based on depth to brightness transition rate. Furthermore, coordinate brightness and depth images may overlap, such that at least some pixel positions of the brightness image may be registered algorithmically to corresponding pixel positions of the coordinate depth image, and vice versa.

Figure 7:
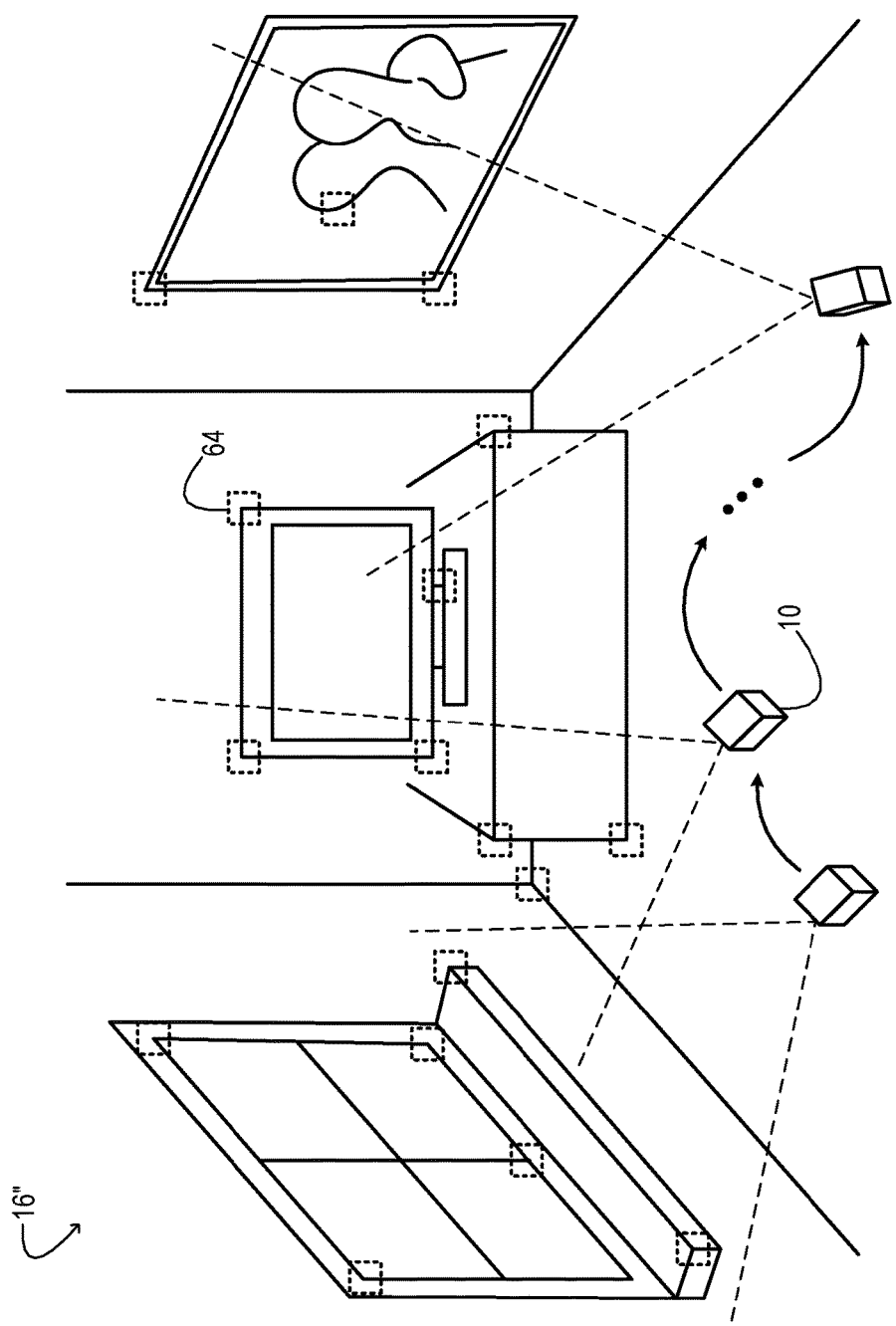
FIG. 7 shows aspects of virtual, three-dimensional modeling of an example subject.

Between successive executions of 60 and 62, the relative position and/or orientation of camera 10 versus subject 16 may be changed. Accordingly, as coordinate brightness and depth images are captured again and again, the subject may be sighted by the camera from a plurality of inequivalent vantage points. A 'vantage point,' as used herein, may be defined by the aperture position $X_0$, $Y_0$, $Z_0$ of the camera and any other point that, together with the aperture position, defines the optical axis of the camera—e.g., a point $X_1$, $Y_1$, $Z_1$ located a predetermined distance in front of the camera aperture, along the optical axis. Change in the relative position and/or orientation of the camera may be realized by movement of the camera, by movement of the subject, or by movement of both the camera and the subject. In this manner, the coordinate brightness and depth images received by the modeling computer at 60 and 62 may be images captured from a plurality of inequivalent vantage points, the vantage points differing in relative position and/or orientation of the camera versus the subject. FIG. 7 shows aspects of an example subject being imaged by a moving camera, imaging a plurality of loci 64. Naturally, this variant is realized more conveniently using a wearable or handheld camera or camera-enabled device.

Returning now to FIG. 6, at 66 of method 58, modeling computer 40 parses data from various depth images acquired from one or more of the vantage points in order to construct a virtual, three-dimensional model of subject 16. The model is held in computer memory machine 46 of the modeling computer. In some implementations, image capture from different vantage points serves to resolve subject features and surfaces that may be occluded from a single vantage point. As the depth-imaging camera moves through the scene, various loci of the subject may be recognized and recorded in order to estimate the changing position and/or orientation of the camera versus the subject (vide infro). A locus of the subject resolved in this manner may also be referred to as a 'feature patch.'

At 68 of method 58, modeling computer 40 determines (e.g., computationally or via a look-up table) an angle-dependent reflectance for each of a plurality of loci of the subject. The angle-dependent reflectance is computed based on the coordinate brightness and depth images acquired from each of the plurality of vantage points that the camera moves through. In some implementations, the angle dependent reflectance R may be a vector-valued function having a horizontal component $R_H$ and a vertical component $R_V$. Each of the horizontal and vertical components of the reflectance may be functions of an incidence angle α and/or an observation angle β defined relative to horizontal or vertical planes. In other implementations, the angle-dependent reflectance may be a scalar function subsuming both horizontal and vertical components or omitting one or the other. In these and other implementations, the dependence of the reflectance on two different angles, α and β, may be simplified according to certain assumptions (vide infra).

In some implementations, the angle-dependent reflectance R may be represented in the form of a table of numbers stored in computer memory machine 46 of modeling computer 40. Each subject locus for which an angle-dependent reflectance is defined may be associated with its own table. A column (or columns) of the table may represent R (or components thereof), evaluated for each of a series of discrete angles, which are represented by the rows. Naturally, the modeling computer may be configured to interpolate between and/or extrapolate beyond the discrete values referenced in the table.

In order to evaluate the reflectance of a given locus at each of a plurality of incidence and/or observation angles, that same locus is observed from a plurality of inequivalent vantage points. Accordingly, one step in the process of accumulating the angle-dependent reflectance is to correlate various observations of the same locus across plural brightness and coordinate depth images captured from different vantage points.

The process is one of associating an observed locus of the subject with corresponding regions of two or more brightness images and of two or more coordinate depth images, such images being captured from two or more vantage points. The association may be achieved in various ways, which generally involve correlating image data captured from prior and subsequent vantage points. One correlation approach is based on recognizing a common feature in two or more brightness or depth images captured from two or more inequivalent vantage points—e.g., a low-probability brightness pattern in two or more brightness images or a low-probability contour in two or more depth images. It should be understood that feature matching need only be realized in either the brightness images or the depth images, for once a match is detected in one set of images, the same subject locus may be identified in the coordinate set, via algorithmic registry of the coordinate brightness and depth images. Another correlation approach is based on estimating in real time, during image capture, the relative position and/or orientation of the camera versus the subject. For relatively small subjects—on the order of centimeters to meters—this can be done using output from an inertial measurement unit (IMU) coupled to the camera. The IMU may include a three-axis accelerometer and three-axis gyroscope, for a combined six degrees-of-freedom (6DOF) measurement. In some implementations, additional sensor input may be fused with IMU output for increased position and/or orientation sensing accuracy. Examples include magnetometer data to provide an absolute orientation, optical flow from camera 10, etc. For larger subjects, a global-positioning system (GPS) receiver may be used.

Once a correlation among regions of two or more brightness images has been established (directly or indirectly), one or more R values may be written into the angle-dependent reflectance table for each observation of a locus made from a unique vantage point. To this end, each brightness image may be converted into a reflectance map. The conversion may be such as to compensate for varying illumination intensity, lens shading, and registration between the infrared emitter 32 and aperture 12 of depth-imaging camera 10. Conversion of a brightness image into a reflectance map may include correction for the geometric fall-off in imaged brightness of each locus of the subject by a factor inversely proportional to the square of the depth of that locus ($1/Z^2$). The depth of the locus may be obtained from the corresponding region of the depth map coordinate to the brightness image from which the reflectance map is obtained. In some implementations, the geometric intensity fall-off may be the only correction applied. From a reflectance map constructed in this manner, reflectance values may be read from pixel positions corresponding to those of the parent brightness image, where association to a subject locus has been made.

In order to determine the angle value(s) corresponding to each reflectance value, the depth image coordinate to the corrected brightness image is again applied. In some implementations, the depth image is processed to estimate a surface-normal vector from each of the plurality of observed loci of the subject. In some implementations, a data pair R, θ may be recorded for each subject locus identified. The data pair may relate incidence (θ=α) or observation (θ=β) angle to the measured reflectivity. In some implementations, θ is defined simply as the angle that the surface-normal vector makes relative to the optical axis of the camera. When the illuminator and imaging optics are approximately co-localized, typically the case for compact imaging systems, the R(α, β) function collapses to a simplified, special case R(θ), in which the incidence and exit angles are equal.

Figure 8:
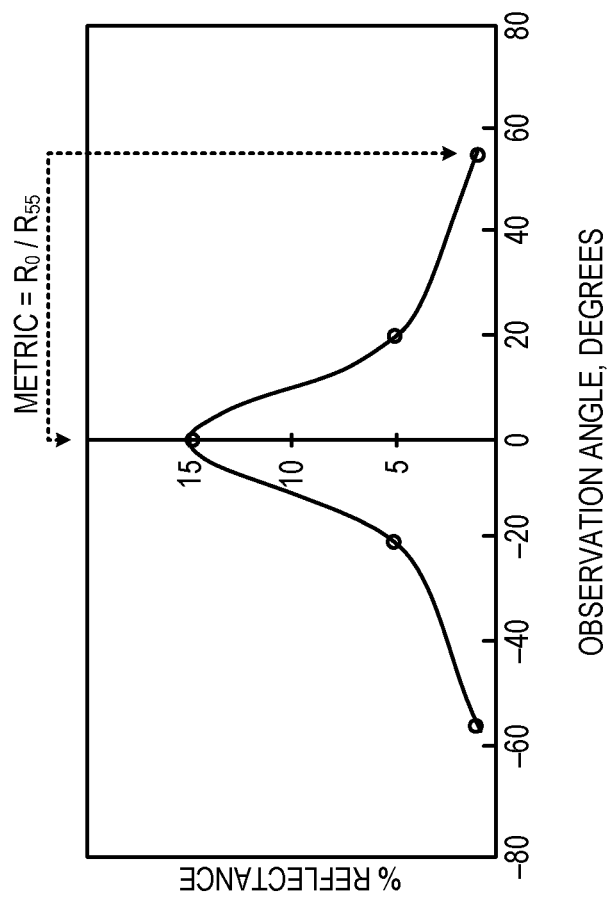
FIG. 8 is a graph of an example bidirectional reflectivity-distribution function (BRDF) of a subject locus.

Continuing in FIG. 6, the foregoing steps are continued as the camera moves about the environment (and/or as the subject moves about the camera), so as to build up an increasingly complete angle-dependent reflectance table for every locus of the subject. In this manner, a bidirectional reflectivity-distribution function (BRDF) may be accumulated for each of the plurality of loci. FIG. 8 illustrates an example bidirectional reflectivity distribution function (BRDF), which may be constructed over time for every subject locus in the scene.

Returning again to FIG. 6, at 70 of method 58, modeling computer 40 assigns a surface attribute, based on the angle-dependent reflectance of each of the plurality loci of the subject, to each of a corresponding plurality of loci of the model. In some implementations, the surface attribute includes a texture. For example, a smooth texture may be assigned to loci exhibiting a relatively narrow BRDF, and a rough texture to loci exhibiting a relatively broad BRDF. To quantify the relative breadth of the BRDF for texturization, and/or secure other advantages, a specularity metric may be computed at 72 of method 58, based on the angle-dependent reflectance of a given locus of the subject.

In some implementations, the specularity metric evaluated at a given locus of the subject expresses reflectance of the locus at a smaller (near-normal) incidence angle relative to reflectance of the locus at a larger (more glancing) incidence angle. Suitable examples may include 0 to 10 degrees for near normal incidence, and 50 to 80 degrees for the more glancing angle. Such metrics estimate the relative specularity of the feature patch being scanned. One formula for determining a specularity metric of a subject locus is illustrated with continued reference to FIG. 8, wherein identifies the reflectivity of the locus measured at zero degrees is compared to the reflectivity measured at 55 degrees. In other, examples, the reflectance measured at 5 degrees may be compared to the reflectance measured at 60 degrees, etc.

In subsequent acts of method 58, modeling computer 40 corrects or invalidates the depth image acquired from at least one of the vantage points based on the angle-dependent reflectance. In some implementations, the depth image is invalidated pursuant to the specularity metric exceeding a predetermined threshold. At 74, accordingly, it is determined whether the specularity metric exceeds a predetermined threshold (e.g., 5.0). If the specularity metric exceeds the threshold, then at 76, any depth map affected by the high specularity is invalidated.

At 78 modeling computer 40 issues an alert (e.g., an error code) pursuant to invalidation of the depth image. In this manner, the user is alerted that the subject includes a feature of high specularity, and may not be scanned properly or to high accuracy, or that OCAP may not complete successfully. Alternatively, or in addition to alerting the user, corrective action may be taken, such as attempting to reverse the effects of the high-specularity feature on the modeling of the subject. More specifically, as the angle-dependent reflectance becomes well defined over a wide range of angles, accurate multipath correction may be applied, as described below.

At 80, therefore, a depth image is corrected to compensate for indirect illumination of a first locus of the subject via a second locus, such that the indirect illumination is compensated in an amount responsive to the angle-dependent reflectance of the second locus. In other words, simultaneous knowledge of the normal vector and the angle-dependent reflectance enables correction for multipath depth errors by predicting how much light must have been reflected from non-occluded subject loci and observed by pixels not associated with such loci.

Figure 9:
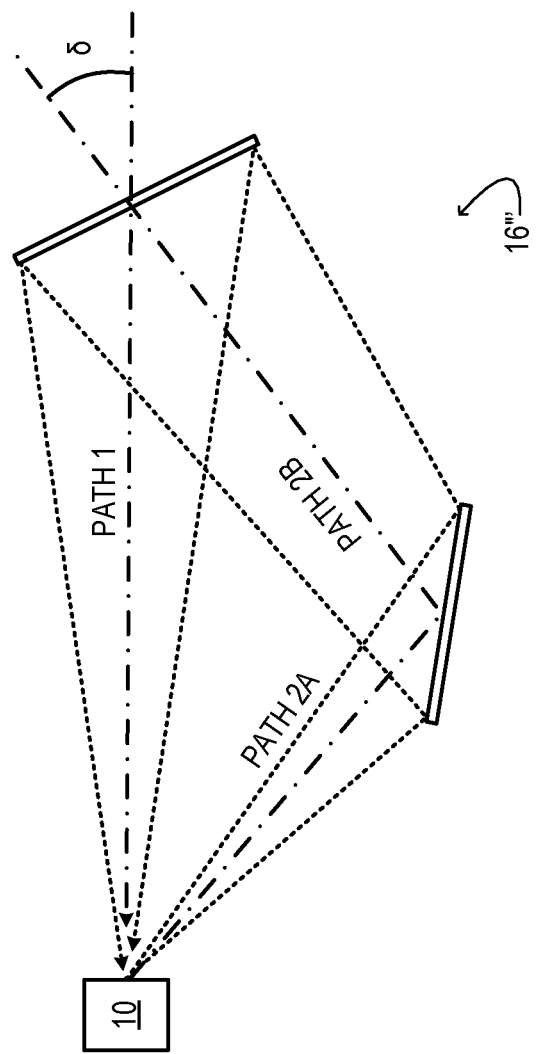
FIG. 9 illustrates aspects of correction of multipath reflection interference in ToF imaging.

FIG. 9 provides an illustration of how specular properties of two target loci can be used to unambiguously predict relative intensity of light on one of the targets from multiple optical paths, thereby allowing a more accurate estimation of depth. Solid angle δ represents the volume observed by a single pixel. If the angle-dependent reflectance is known, then intensity reflected back to the camera can be predicted from the surface-normal vectors and from the depth-image stream.

The methods and processes described herein may be tied to a computing system of one or more computing devices. In particular, such methods and processes may be implemented as a computer-application program or service, an application-programming interface (API), a library, and/or other computer-program product.

FIG. 3 schematically shows a non-limiting embodiment of a computing system in the form of modeling computer 40 that can enact one or more of the methods and processes described above. The modeling computer is shown in simplified form in FIG. 3. The modeling computer may take the form of one or more personal computers, server computers, tablet computers, home-entertainment computers, network computing devices, gaming devices, mobile computing devices, mobile communication devices (e.g., smart phone), and/or other computing devices.

The modeling computer includes a logic machine 48 and a computer memory machine 46. The modeling computer may optionally include a display subsystem, an input subsystem, a communication subsystem, and/or other components not shown in FIG. 3.

Logic machine 48 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Computer memory machine 46 includes one or more physical devices configured to hold instructions executable by the logic machine to implement the methods and processes described herein. When such methods and processes are implemented, the state of computer memory machine 46 may be transformed—e.g., to hold different data.

Computer memory machine 46 may include removable and/or built-in devices. Computer memory machine 46 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Computer memory machine 46 may include volatile, nonvolatile, dynamic, static, read/write, read-only, random-access, sequential-access, location-addressable, file-addressable, and/or content-addressable devices.

It will be appreciated that computer memory machine 46 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 48 and computer memory machine 46 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of the modeling computer implemented to perform a particular function. In some cases, a module, program, or engine may be instantiated via logic machine 48 executing instructions held by computer memory machine 46. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, a display subsystem of the modeling computer may be used to present a visual representation of data held by computer memory machine 46. This visual representation may take the form of a graphical user interface (GUI). As the herein described methods and processes change the data held by the computer memory machine, and thus transform the state of the computer memory machine, the state of the display subsystem may likewise be transformed to visually represent changes in the underlying data. The display subsystem may include one or more display devices utilizing virtually any type of technology. Such display devices may be combined with logic machine 48 and/or computer memory machine 46 in a shared enclosure, or such display devices may be peripheral display devices.

When included, an input subsystem of the modeling computer may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, a communication subsystem of the modeling computer may be configured to communicatively couple the modeling computer with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow the computing system to send and/or receive messages to and/or from other devices via a network such as the Internet.

Aspects of this disclosure are described by example, and with reference to the attached drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic not necessarily drawn to scale. Rather, the various drawing scales, aspect ratios, and numbers of components shown in the figures may be purposely distorted to make certain features or relationships easier to see.

One aspect of this disclosure provides a method for virtual, three-dimensional modeling of a subject using a depth-imaging camera operatively coupled to a modeling computer. The method comprises: with the modeling computer, receiving from the depth-imaging camera a brightness image and a coordinate depth image of the subject acquired from each of a plurality of inequivalent vantage points relative to the subject, the brightness image including a brightness value for each of a plurality of pixel positions, the coordinate depth image including a depth value for each of a plurality of pixel positions; in the modeling computer, parsing data from depth images acquired from one or more of the inequivalent vantage points to construct a virtual, three-dimensional model of the subject; determining with the modeling computer, for each of a plurality of loci of the subject, an angle-dependent reflectance based on the brightness and coordinate depth images received from the depth-imaging camera; and with the modeling computer, assigning a surface attribute, based on the angle-dependent reflectance of each of the plurality loci of the subject, to each of a corresponding plurality of loci of the model.

In some implementations, the surface attribute includes a texture. In some implementations, the method further comprises changing a relative position and/or orientation of the depth-imaging camera versus the subject, such that the subject is sighted by the depth-imaging camera from each of the plurality of inequivalent vantage points.

Another aspect of this disclosure provides a method for virtual, three-dimensional modeling of a subject using a depth-imaging camera operatively coupled to a modeling computer. The method comprises: with the modeling computer, receiving from the depth-imaging camera a brightness image and a coordinate depth image of the subject acquired from each of a plurality of inequivalent vantage points relative to the subject, the brightness image including a brightness value for each of a plurality of pixel positions, the coordinate depth image including a depth value for each of a plurality of pixel positions; determining with the modeling computer, for each of a plurality of loci of the subject, an angle-dependent reflectance based on the brightness and coordinate depth images received from the depth-imaging camera; and with the modeling computer, correcting or invalidating the depth image acquired from at least one of the inequivalent vantage points based on the angle-dependent reflectance.

In some implementations, determining the angle-dependent reflectance includes registering incidence and reflection angle from each of the plurality of loci of the subject to reflectance at that locus. In some implementations, determining the angle-dependent reflectance includes accumulating a bidirectional reflectivity-distribution function for each of the plurality of loci of the subject. In some implementations, determining the angle-dependent reflectance includes processing a depth image to estimate a surface-normal vector for each of the plurality of loci of the subject. In some implementations, determining the angle-dependent reflectance includes associating a given subject locus of the subject with corresponding regions of two or more brightness images and with corresponding regions of two or more coordinate depth images. In some implementations, associating the given locus of the subject with corresponding regions of two or more brightness images and with corresponding regions of two or more coordinate depth images includes correlating prior and subsequent vantage points. In some implementations, associating the given locus of the subject with corresponding regions of two or more brightness images and with corresponding regions of two or more coordinate depth images includes recognizing a common feature in brightness or coordinate depth images from two or more inequivalent vantage points. In some implementations, associating the given locus of the subject with corresponding regions of two or more brightness images and with corresponding regions of two or more coordinate depth images includes estimating a relative position and/or orientation of the depth-imaging camera versus the subject based on output of an inertial measurement unit coupled to the depth-imaging camera. In some implementations, determining the angle-dependent reflectance includes converting a brightness image into a reflectance map. In some implementations, conversion of the brightness image into a reflectance map compensates for one or more of illumination intensity, lens shading, and registration between an infrared emitter and an aperture of the depth-imaging camera. In some implementations, conversion of the brightness image into a reflectance map includes correction for a geometric fall-off in imaged brightness from each locus of the subject by a factor inversely proportional to a square of a depth of that locus. In some implementations, correcting or invalidating the depth image includes invalidating the depth image pursuant to a specularity metric exceeding a threshold, the method further comprising determining the specularity metric based on the angle-dependent reflectance of a locus of the subject. In some implementations, the method further comprises issuing an alert pursuant to invalidation of the depth image. In some implementations, the specularity metric evaluated at a given locus of the subject expresses reflectance of the locus at a smaller incidence angle relative to reflectance of the locus at a larger incidence angle. In some implementations, correcting or invalidating the depth image includes correcting the depth image to compensate for indirect illumination of a first locus of the subject via a second locus of the subject, such that the indirect illumination is compensated in an amount responsive to the angle-dependent reflectance of the second locus of the subject.

Another aspect of this disclosure provides a virtual, three-dimensional modeling system comprising: a hardware interface configured to receive, from a depth-imaging camera, a brightness image and a coordinate depth image of the subject acquired from each of a plurality of inequivalent vantage points relative to the subject, the brightness image including a brightness value for each of a plurality of pixel positions, the coordinate depth image including a depth value for each of a plurality of pixel positions; a computer memory machine configured to hold a virtual, three-dimensional model of the subject; logic operatively coupled to the computer memory machine, including: logic to parse data from depth images acquired from one or more of the inequivalent vantage points to construct a virtual, three-dimensional model of the subject in the machine-readable memory, logic to determine, for each of a plurality of loci of the subject, an angle-dependent reflectance based on the brightness and coordinate depth images received from the depth-imaging camera, and logic to assign a surface attribute, based on the angle-dependent reflectance of each of the plurality loci of the subject, to each of a corresponding plurality of loci of the model.

In some implementations, the depth-imaging camera is a time-of-flight camera including a modulated infrared emitter configured to illuminate the subject.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for virtual, three-dimensional modeling of a subject using a depth-imaging camera operatively coupled to a modeling computer, the method comprising:
    with the modeling computer, receiving from the depth-imaging camera a brightness image and a coordinate depth image of the subject acquired from each of a plurality of inequivalent vantage points relative to the subject, the brightness image including a brightness value for each of a plurality of pixel positions, the coordinate depth image including a depth value for each of a plurality of pixel positions;
    in the modeling computer, parsing data from depth images acquired from one or more of the inequivalent vantage points to construct a virtual, three-dimensional model of the subject;
    determining with the modeling computer, for each of a plurality of loci of the subject, an angle-dependent reflectance based on the brightness and coordinate depth images received from the depth-imaging camera; and
    with the modeling computer, assigning a surface attribute, based on the angle-dependent reflectance of each of the plurality loci of the subject, to each of a corresponding plurality of loci of the model.

2. The method of claim 1 wherein the surface attribute includes a texture.

3. The method of claim 1 further comprising changing a relative position and/or orientation of the depth-imaging camera versus the subject, such that the subject is sighted by the depth-imaging camera from each of the plurality of inequivalent vantage points.

4. A method for virtual, three-dimensional modeling of a subject using a depth-imaging camera operatively coupled to a modeling computer, the method comprising:
    with the modeling computer, receiving from the depth-imaging camera a brightness image and a coordinate depth image of the subject acquired from each of a plurality of inequivalent vantage points relative to the subject, the brightness image including a brightness value for each of a plurality of pixel positions, the coordinate depth image including a depth value for each of a plurality of pixel positions;
    determining with the modeling computer, for each of a plurality of loci of the subject, an angle-dependent reflectance based on the brightness and coordinate depth images received from the depth-imaging camera; and
    with the modeling computer, correcting or invalidating the depth image acquired from at least one of the inequivalent vantage points based on the angle-dependent reflectance.

5. The method of claim 4 wherein determining the angle-dependent reflectance includes registering incidence and reflection angle from each of the plurality of loci of the subject to reflectance at that locus.

6. The method of claim 4 wherein determining the angle-dependent reflectance includes accumulating a bidirectional reflectivity-distribution function for each of the plurality of loci of the subject.

7. The method of claim 4 wherein determining the angle-dependent reflectance includes processing a depth image to estimate a surface-normal vector for each of the plurality of loci of the subject.

8. The method of claim 4 wherein determining the angle-dependent reflectance includes associating a given subject locus of the subject with corresponding regions of two or more brightness images and with corresponding regions of two or more coordinate depth images.

9. The method of claim 8 wherein associating the given locus of the subject with corresponding regions of two or more brightness images and with corresponding regions of two or more coordinate depth images includes correlating prior and subsequent vantage points.

10. The method of claim 8 wherein associating the given locus of the subject with corresponding regions of two or more brightness images and with corresponding regions of two or more coordinate depth images includes recognizing a common feature in brightness or coordinate depth images from two or more inequivalent vantage points.

11. The method of claim 8 wherein associating the given locus of the subject with corresponding regions of two or more brightness images and with corresponding regions of two or more coordinate depth images includes estimating a relative position and/or orientation of the depth-imaging camera versus the subject based on output of an inertial measurement unit coupled to the depth-imaging camera.

12. The method of claim 4 wherein determining the angle-dependent reflectance includes converting a brightness image into a reflectance map.

13. The method of claim 12 wherein conversion of the brightness image into a reflectance map compensates for one or more of illumination intensity, lens shading, and registration between an infrared emitter and an aperture of the depth-imaging camera.

14. The method of claim 12 wherein conversion of the brightness image into a reflectance map includes correction for a geometric fall-off in imaged brightness from each locus of the subject by a factor inversely proportional to a square of a depth of that locus.

15. The method of claim 4 wherein correcting or invalidating the depth image includes invalidating the depth image pursuant to a specularity metric exceeding a threshold, the method further comprising determining the specularity metric based on the angle-dependent reflectance of a locus of the subject.

16. The method of claim 4 further comprising issuing an alert pursuant to invalidation of the depth image.

17. The method of claim 4 wherein the specularity metric evaluated at a given locus of the subject expresses reflectance of the locus at a smaller incidence angle relative to reflectance of the locus at a larger incidence angle.

18. The method of claim 4 wherein correcting or invalidating the depth image includes correcting the depth image to compensate for indirect illumination of a first locus of the subject via a second locus of the subject, such that the indirect illumination is compensated in an amount responsive to the angle-dependent reflectance of the second locus of the subject.

19. A virtual, three-dimensional modeling system comprising:
    a hardware interface configured to receive, from a depth-imaging camera, a brightness image and a coordinate depth image of the subject acquired from each of a plurality of inequivalent vantage points relative to the subject, the brightness image including a brightness value for each of a plurality of pixel positions, the coordinate depth image including a depth value for each of a plurality of pixel positions;
    a computer processor;
    a computer memory machine operatively coupled to the computer processor and configured to hold electronically a virtual, three-dimensional model of the subject, together with instructions executable on the computer processor, the instructions including:
        instructions to parse data from depth images acquired from one or more of the inequivalent vantage points to construct a virtual, three-dimensional model of the subject in the machine-readable memory,
        instructions to determine, for each of a plurality of loci of the subject, an angle-dependent reflectance based on the brightness and coordinate depth images received from the depth-imaging camera, and
        instructions to assign a surface attribute, based on the angle-dependent reflectance of each of the plurality loci of the subject, to each of a corresponding plurality of loci of the model.

20. The modeling system of claim 19 wherein the depth-imaging camera is a time-of-flight camera including a modulated infrared emitter configured to illuminate the subject.

* * * * *